Figure 1:
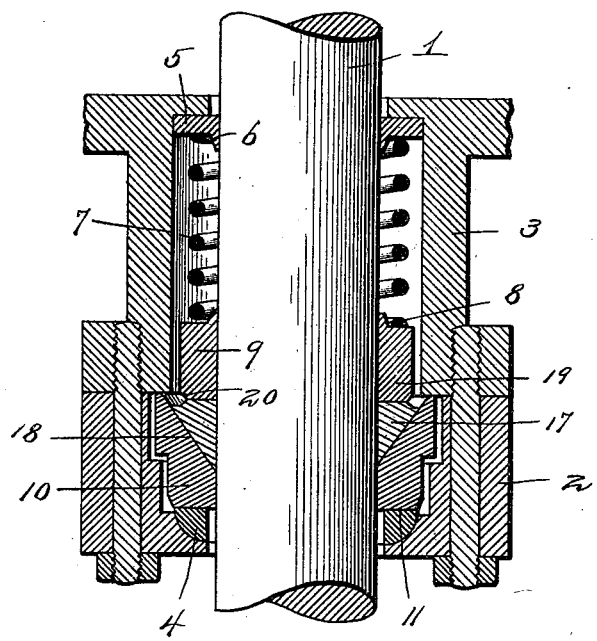

No. 626,129. Patented May 30, 1899.
J. BADEKER.
PISTON ROD PACKING.
(Application filed Oct. 14, 1898.)
(No Model.)

Witnesses
Harry L. Ames.
K. C. Rau

Inventor
John Badeker.
By V. D. Stockbridge,
His Attorney

UNITED STATES PATENT OFFICE.

JOHN BADEKER, OF OMAHA, NEBRASKA.

PISTON-ROD PACKING.

SPECIFICATION forming part of Letters Patent No. 626,129, dated May 30, 1899.

Application filed October 14, 1898. Serial No. 693,524. (No model.)

*To all whom it may concern:*

Be it known that I, JOHN BADEKER, a citizen of the United States, residing at Omaha, in the county of Douglas and State of Nebraska, have invented certain new and useful Improvements in Piston-Rod Packings; and I do hereby declare the following to be a full, clear, and exact description of the invention, such as will enable others skilled in the art to which it appertains to make and use the same.

This invention relates to piston-rod packing, and while especially designed for use in connection with piston-rods it will be apparent as the description proceeds that the improvement may be utilized in connection with any reciprocating or rotating rod or shaft.

The object of the invention is to provide a self-adjusting packing adapted to conform closely to and form a tight joint with a piston rod or shaft, provision being made whereby the packing is maintained in contact with such rod or shaft at all times. The arrangement is such that the packing will adjust itself uniformly at all points around the shaft, and thus compensate for wear and will afford a continuous and unbroken bearing-surface around the rod or shaft. The construction also admits of the ready removal of the packing-sections when worn to a considerable extent and the replacing of new sections of packing material.

The detailed objects and advantages of the invention will appear in the course of the subjoined description.

The invention consists in an improved packing and adjusting means therefor embodying certain novel features and details of construction and arrangement of parts, as hereinafter fully described, illustrated in the drawings, and incorporated in the claims.

Figure 2:
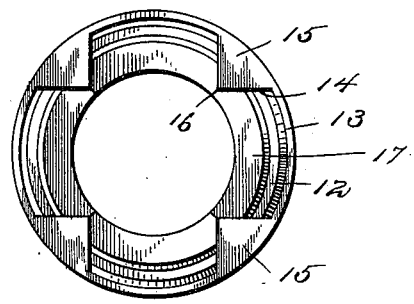
Figure 3:
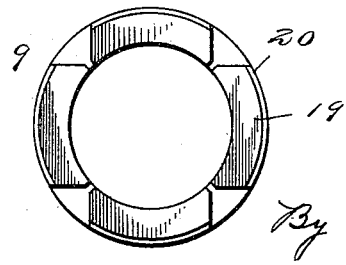

In the accompanying drawings, Figure 1 is a longitudinal section through the improved packing and adjusting means therefor. Fig. 2 is an inner face view of the cone with the packing-sections in place. Fig. 3 is an outer face view of the following ring.

Similar numerals of reference designate corresponding parts in all the views.

The packing contemplated in this invention is designed to be used on piston-rods, valve-stems, air and water pumps, and all kinds of engines. For convenience the packing has been shown as applied to a piston-rod, (indicated at 1.)

2 indicates an ordinary gland, and 3 a stuffing-box connected thereto in any ordinary or preferred manner. The gland is provided with a concave annular seat substantially quadrant-shaped in cross-section to receive a ball-joint ring 4, also quadrant-shaped in cross-section for the purpose of allowing the packing to accommodate itself to the piston-rod in case the guides for said rod are slightly out of line.

Within the inner end of the stuffing-box is what may be termed a "back ring" 5, which is formed with an annular seat 6 upon its outer surface for one end of a coil-spring 7, the opposite end of which is seated in an annular groove 8 in a following ring 9, fitting closely around the piston-rod 1.

Fitting snugly around the piston-rod 1 is what I term a "cone" 10, said cone having an outer flat face 11, which bears against the adjacent flat face of the ball-joint ring 4, thus preventing the movement of the cone in the direction of said ring. The cone in its inner side is provided with segmental pockets or recesses 12. The wall 13 of each pocket or recess 12 is also oblique or inclined with regard to the surface of the piston-rod, thus making the pocket or recess wedge-shaped, said wall beginning at a point immediately adjacent to the piston-rod and extending from thence outward obliquely and terminating near the periphery of the cone, as clearly shown in Figs. 1 and 2. While the wall 13 is curved, the end walls 14 of each pocket or recess 12 are parallel to each other, thus forming triangular-shaped webs 15, which intervene between the pockets or recesses 12, four of such pockets being shown, although the number may be increased or diminished without departing from the principle of the invention. It is also preferred to terminate the inner corners 16 of the webs 15 a slight distance from the surface of the piston-rod, thus allowing the packing-sections (shown at 17) to meet between the corners 16 and the piston-rod, thereby obtaining a continuous and unbroken bearing-surface of the packing upon the piston-rod.

The packing-sections 17 are formed of Babbitt metal, lead metal, or other suitable material and correspond in shape to the pockets in which they fit, being provided with outer curved and oblique sides 18, so that any pressure brought to bear upon the exposed portions of the packing-sections will effect a crowding inward of said sections against the piston-rod.

The following ring 9 is provided upon that surface adjacent to the cone 10 with segmental bosses 19, corresponding in shape to the open ends of the pocket 12, but made slightly narrower in a radial direction, so that they can partially enter said pockets. The bosses are further beveled or chamfered off on their outer edges, as shown at 20, to facilitate their entrance into the pockets 12. It will be understood that the bosses 19 bear against the outer exposed sides of the packing-sections 17, and as the following ring 9 is constantly pressed toward the cone 10 by the spring 7 it will be seen that a constant pressure is brought to bear upon the packing-sections, so that as the bearing-surface of said sections is worn away the sections are crowded into the cone, and on account of the wedging section of the cone said sections are crowded radially inward and caused to bear with a constant and proper pressure against the piston-rod.

From the foregoing description it will be seen that I have provided a very simple and self-adjusting packing which will maintain a tight joint between the piston-rod cylinder or casing at all times and that the several parts of the packing may be readily disassociated for renewing the packing-sections.

It is to be understood that I do not desire to limit myself to the specific application of the improvements above described; but I reserve to myself the right to employ the packing in connection with a piston rod or shaft of any engine, pump, or other piece of mechanism wherever it is necessary to maintain a tight joint between two parts one of which is movable.

Having thus described the invention, what is claimed as new, and desired to be secured by Letters Patent, is—

1. The combination with a rod or shaft, of a cone surrounding the same and provided with wedge-shaped pockets open at one end and having walls set oblique to the surface of the rod or shaft, segmental packing-sections, fitted in said pockets, a following ring surrounding the rod or shaft and having bosses bearing against the inner sides of said sections, and means for constantly pressing the following ring toward the cone, substantially as described.

2. The combination with a rod or shaft, of a cone fitting around the same and provided in one side with wedge-shaped pockets, one wall of each of which is oblique and the end walls of which are substantially parallel to each other, and a spring-pressed following ring surrounding said rod or shaft and having segmental bosses which bear against the packing-sections for urging the same into the pockets of the cone, substantially as described.

3. The combination with a rod or shaft, of a cone fitting around the same and provided with segmental pockets each having an oblique outer wall, segmental packing-sections corresponding in shape to and fitting within said pockets, and a spring-pressed following ring having segmental bosses bearing against said packing-sections and adapted to partially enter said pockets, the outer edges of said bosses being chamfered, substantially as described.

4. The combination with a rod or shaft, of a cone fitting snugly around the same and provided in one side with wedge-shaped segmental pockets, each having an oblique wall, said pockets being separated by intervening and substantially triangular webs, a spring-pressed following ring fitting around the rod or shaft and provided with segmental bosses of less width radially than the entrance to the pockets in the cone, and packing-sections corresponding in shape to and fitting within said pockets and having the bosses bearing against the same, substantially as specified.

In testimony whereof I affix my signature in presence of two witnesses.

JOHN BADEKER.

Witnesses:
T. J. NOLAN,
W. J. McCRANN.